United States Patent
Cabezas et al.

(10) Patent No.: US 6,426,962 B1
(45) Date of Patent: Jul. 30, 2002

(54) TOKEN RING JITTER GENERATOR/ DETECTOR

(75) Inventors: Rafael Graniello Cabezas, Austin; Randy Lynn Gregory, Round Rock, both of TX (US); Tamleigh Jonathan Ross, Sacramento, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/103,781

(22) Filed: Jun. 24, 1998

(51) Int. Cl.[7] .................................................. H04J 3/06
(52) U.S. Cl. ...................................................... 370/516
(58) Field of Search ................................. 370/516, 503, 370/518, 403, 404, 405, 406, 407, 408, 222, 223, 224, 241, 252, 254, 248, 249, 251, 258, 216, 450, 509, 517

(56) References Cited

U.S. PATENT DOCUMENTS

| | | | |
|---|---|---|---|
| 4,663,748 A | * | 5/1987 | Karbowiak et al. ......... 370/224 |
| 5,309,428 A | | 5/1994 | Copley et al. |
| 5,363,366 A | | 11/1994 | Wisdom, Jr. et al. |
| 5,365,513 A | | 11/1994 | Copley et al. |
| 5,381,348 A | | 1/1995 | Ernst et al. |
| 5,425,017 A | | 6/1995 | Copley et al. |
| 5,444,695 A | | 8/1995 | Copley et al. |
| 5,524,109 A | * | 6/1996 | Smith et al. ................ 370/517 |

* cited by examiner

Primary Examiner—Dang Ton
(74) Attorney, Agent, or Firm—Edmond A. De Frank; Volel Emile

(57) ABSTRACT

An apparatus and method is provided whereby a monitor module on a token ring network assigns an active monitor and then activates a transmitting module resident on each station on the network to transmit test data frames of varying lengths which have been tuned to encourage maximum phase jitter on the network. Phase jitter related errors are then observed with a dedicated commercially available test apparatus or program.

50 Claims, 12 Drawing Sheets

| SEG 1 | SEG 2 | SEG 3 | SEG 4 | SEG 5 |
|---|---|---|---|---|
| 00000000 | 11111111 | 00000000 | 11111111 | 00000000 |

| <<--------RING LATENCY-------->> |

| NO. | ID | PRIM. ADDR. | ALT. ADDR. | TEXT TM. | TEXT DT. | RESULT |
|---|---|---|---|---|---|---|
| [001] | S | 10005AB14361 | 7FFFFFFFFF00 | 05:23:35 | 04-27-97 | * |
| [002] | C | 08005A81DE6C | 7FFFFFFFFF01 | HH:MM:SS | MM-DD-YY | * |
| [003] | A | 10005AC96DF3 | 7FFFFFFFFF02 | HH:MM:SS | MM-DD-YY | - |
| [004] | S | 10005AB1C129 | 7FFFFFFFFF03 | HH:MM:SS | MM-DD-YY | - |
| [005] | S | 10005AC9613A | 7FFFFFFFFF04 | HH:MM:SS | MM-DD-YY | - |
| [006] | S | 10005AB142D2 | 7FFFFFFFFF05 | HH:MM:SS | MM-DD-YY | - |

PRESS THE << ENTER >> KEY TO CONTINUE

FIG. 5

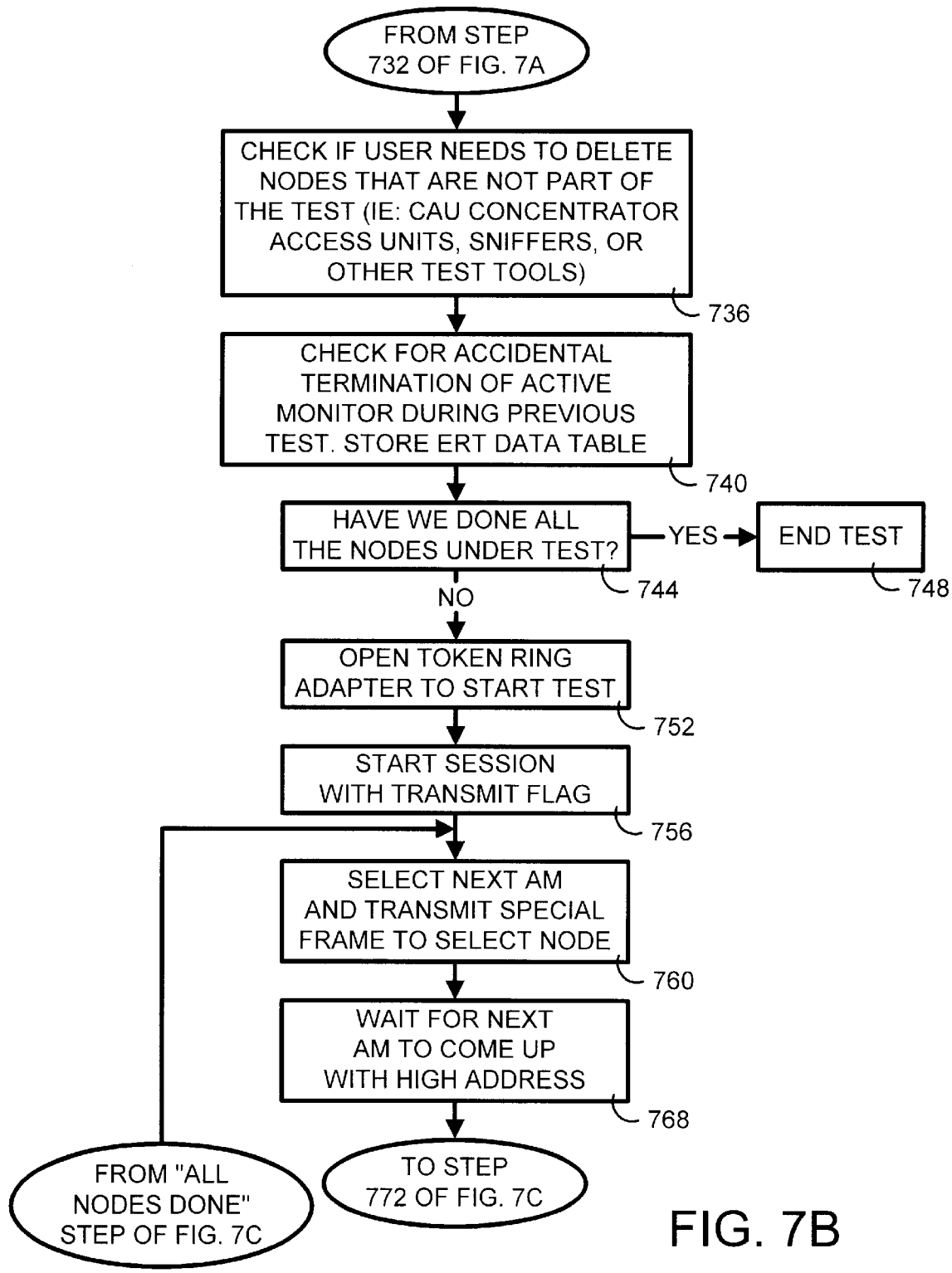

HALF TEST MENU
STOP SPECIFIC OR ALL HOSTS
HOST(S) WILL NOT BE ABLE TO RETURN TO TEST

SUSPEND TEST MENU
SPECIFIC OR ALL HOSTS
HOST(S) WILL NOT PARTICIPATE IN TEST BUT
CAN RESUME TEST ON COMMAND.

RESUME TEST MENU
RETURN SUSPENED HOST(S) TO TEST

TABLE MENU
DISPLAY TEST CONFIGURATION TABLE.

SET/RESET ADDRESS
CHANGE ADDRESS TO ALTERNATE OR
PRIMARY ADDRESS OF ANY HOST

ACTIVE MONITOR
SELECT SPECIFIC HOST TO
BE THE ACTIVE MONITOR

FIG. 9

TOKEN RING JITTER GENERATOR/ DETECTOR

FIELD OF THE INVENTION

Present invention relates to local area network (LAN) testers in particular, and in particular to software to detect phase jitter intolerant stations on a token ring local area network. BACKGROUND OF THE INVENTION In general, most computer networks have the goal of moving data among the computers connected to the network. Each network must have some mechanism for regulating access to the transmission of this data. Several approaches exist to regulate access to the transmission of data in local area networks. These include contention, token passing, demand priority, and direct switching. The present invention relates to token passing networks, and more specifically, token ring networks as defined by the ISO/IEC 8802-5 token ring standard.

A token ring network uses a logical ring topology, shown in FIG. 1, that is physically wired as a star with workstations connected to a wiring concentrator. Wiring concentrators can be cabled together to expand the capacity of the LAN.

FIG. 2 illustrates the wiring of workstations to each wiring concentrator. Each workstation uses a twisted pair connection for input and a second twisted pair for output with the data flowing from station to station in one direction to implement a logical ring. The wiring concentrator also controls access of each work station to the LAN.

Token ring adapter cards or Network Interface Cards (NICs) are installed on each workstation to allow it to be connected to the wiring concentrator. Each NIC has several capabilities. First, it has input and output buffers which allow data files of various lengths communicated from the workstation to be stored and then serialized before being clocked onto the network. Second, each NIC is also equipped with a phase lock loop circuit which is capable of extracting a clock signal which is transmitted with the data. Small variations in the clock rate (or phase) may occur as data is transmitted between workstations. If the rate of clock phase change is excessive, the phase lock loop circuits in a typical NIC cannot recover the clock signal and will generate an error. A third capability of the NIC is to report clock signal and other errors automatically by generating Error Report MAC frames which are transmitted onto the network.

ISO/IEC 8802-5 networks may operate at 4 or 16 megabits per second (Mbps). Each station on the network must operate at the same speed.

A "token" is a special data "frame" which is passed from workstation to workstation in sequence along the ring. The token frame is only a few bytes in length and contains a bit pattern which can be changed into a start of frame delimiter (SOF) by changing a series of bits into a start sequence. Immediately following the SOF is a sequence of source and destination address pairs that identify the sending and transmitting workstations, respectively.

The token is recognized by all workstations as being the arbiter of access for the transmission of the data. A workstation must have the token to place data frames on the network. If it does not have the token it must wait until it gets the token from its upstream neighbor in order to transmit data. If the token is passed to a workstation that needs to transmit data, the workstation converts the token to an SOF, appends the source and destination address. and then adds data to be transmitted. If the token is passed to a workstation that doesn't need to transmit data, the workstation sends the token to the next downstream workstation.

The SOF and the data frame travel around the ring from workstation to workstation. Each workstation reads the start sequence and the destination address. If the workstation's address does not match the destination address, the workstation merely retransmits it on downstream. If the workstation address matches the destination address, the workstation copies the frame into memory and modifies a bit pattern to signify it copied the transmitted data. If a data frame is transmitted in broadcast mode, each workstation receives and copies the frame without regard to the destination address. The frame travels around the ring until it eventually returns to the sending workstation. Latency is a measure of the delay it takes one byte to travel completely around the network ring. The sending workstation then strips the data frame from the ring and transmits a token in its place.

The ISO/IEC 8802-5 Token Ring data frame structure is the standard data frame structure that has been adopted by most token ring topologies. The minimum length of a token ring data frame is 21 bytes. The maximum data frame size under this standard is determined by the ring's signaling speed. A frame that is just large enough to fill the ring at any given time can be called the latency limit of the network.

FIG. 3 shows a diagram of the ISO/IEC 8802-5 data frame structure. The first field is that Starting Delimiter, which identifies the beginning of the frame. Next is the Access Control field. This field stores the "type" bits that identify the transport protocol. This field is also used to differentiate between data frames and control frames. The first two bits identify the type of frame: data or Media Access Control (MAC) management. MAC frames are used to collect network performance data that can be analyzed by standards-compliant network management products. Each MAC frame performs a specific network management function, such as a claim token used to select an active monitor for the network. The next six bits are used to inform the recipient of the priority of the data Protocol Data Unit (PDU) and/or MAC PDU.

The next two fields are the destination and source MAC addresses. Each one is a 6-byte field. The data field follows. It varies in size, based upon the signaling speed of the ring. 4Mbps Token Rings can support data fields of maximum size 4,332 bytes. 16 Mbps Token Rings can support data field that are of maximum size 17,832.

The last three fields in the data frame are the 2 byte Frame Check Sequence (FCS) and a 1 byte ending delimiter. The FCS contains a mathematically derived value that is calculated based upon the length and content of the frame. The recipient and transmitter each apply the same algorithm to the frame. If the recipient computes the same value stored in the FCS field (which was calculated by the transmitter), then it assumes that the contents were transmitted correctly.

The ISO/IEC 8802-5 Token Ring standard establishes several Network Management Agents (NMAs). These agents may reside at each Token Ring workstation and are used in the normal management operation of the ring. These agents include active or standby monitors (AM or SM), ring error monitor (REM), Configuration Report Server (CRS) and Ring Parameter Server (RPS).

Token Ring network protocol is monitored by the Active Monitor (AM). The AM theoretically can be any station in the ring. Usually, it is the first station to become active but, after more stations activate, the responsibility can be contested and assumed by another station. The AM monitors all traffic, ensures that the network's protocol rules are adhered to and initiates action that may be necessary to overcome protocol violations or failures. All the network workstations have the capability to be the AM, but only one can be the AM at a time. The other stations are known as Standby Monitors (SM).

The AM's duties includes the following: 1) initializing the ring by issuing a Ring Purge MAC Frame upon start-up, 2) creating tokens, 3) providing the master clock for the network and 4) ensuring that tokens and frames do not traverse the ring more than once.

The ISO/IEC 8802-5 standard provides for an AM contention process called token claiming. This process is initiated by any of the SMs whenever they detect a possible failure of the AM. Numerous possible symptoms can trigger this process. They include the failure of the AM to transmit a good token frame at least once every 2.6 seconds, the failure of the AM to transmit an AM Present MAC Frame at least once every 15 seconds, unsuccessful ring purge attempts, inconsistencies with the clock, absence of AM Present or Standby Monitor Present MAC frames after a station insertion, the AM losing power, experiencing a hardware or software failure, or the AM being physically disconnected from the LAN.

When any station detects a need for a new AM, it will initiate monitor contention by sending a claim token MAC frame. Any station receiving a claim token frame with a source address numerically higher than its own will merely repeat that frame. Any station receiving a claim token with a source address less than its own will itself transmit a claim token with its own (higher) source address. A station that is currently transmitting claim tokens will cease if it received a claim token sent by some other station with a source address higher than its own. Following these rules, eventually only the highest numbered address station will be sending claim tokens on the ring. When this highest numbered station receives three of its own claim token frames without receiving any others, it wins the claim token process and becomes the AM.

The AM asserts the system clock for the network which is encoded in each data transmission. The method of encoding used in the token ring network is called Differential Manchester Coding. An example of data coding using a Differential Manchester code is shown in FIG. 4. As can be seen, the use of a Differential Manchester code provides a strong timing component for clock recovery because a timing transition always occurs in the middle of every bit transmitted. The polarity only changes at a bit cell boundary if the next bit is a "0". Therefore, consecutive zeros appear as a 16 MHz square wave and consecutive ones appear as an 8 MHz square wave. This gives the Differential Manchester Code a vulnerability to phase jitter because these two frequencies have slightly different propagation velocities.

Each successive workstation receives data via the Differential Manchester code and proceeds to extract the clock rate and phase from the continuous transitions contained in the code. Due to imperfections in clock-signal-extraction and data-regeneration circuits, crosstalk, electrical noise, component inconsistencies, and other causes, the clock rate and phase received by each workstation may differ slightly. Clock phase jitter is the change in phase as compared to the clock of the AM. If phase jitter becomes severe, the phase lock loop contained in each NIC cannot correctly extract data from the frame. This condition causes detectable frame losses and error report MAC frames to be generated.

One aspect of creating a worst case jitter effect involves the data frame pattern. Strings of ones followed by strings of zeros (or vice versa) create phase jitter at the transition between the two strings. Another aspect of creating a worst case jitter effect is having the transmitting station receiving and stripping one of these string transitions at the same time it is transmitting the identical string transition.

In an effort to isolate phase jitter, the prior art has, in general, required the addition of special hardware to the token ring to track phase jitter. An example of this prior art is U.S. Pat. No. 5,309,428 to Copley. Copley discloses a token ring network testing apparatus which includes a state machine, a hardware phase jitter pattern generator, a rising edge generation circuit, a falling edge generation circuit and a comparator to determine phase jitter. Copley also provides for an interprelator which amplifies the phase jitter detected and a counter to track phase jitter patterns. However, Copley, as with other prior art test systems, requires addition of complex circuitry to the local area network and does not automatically provide for observation of the jitter reaction of all possible network configurations.

A need exists in the art for a methodology to evoke a worse case scenario phase jitter into a token ring network by using tuned data patterns. Additionally, a need exists for a method to automatically alter the conditions on the network to produce all important combinations of AMs, SMs and frame lengths to create phase jitter. For instance, a need exists for a methodology which automatically changes the AM and sizes or "tunes" test frames to create a worse case jitter production scenario in each NIC.

SUMMARY OF THE INVENTION

The preferred embodiment responds to the need in the art by providing a system to automatically assign and change the AM and to generate and transmit test data frames of varying structure to fully test a network for clock phase jitter. The invention first deploys a data frame generation and transmission module to each workstation in the network. A monitor module, resident on only one workstation, then chooses and activates one of the workstations as the AM. On a signal from the monitor module, each transmission module then generates test data frames and transmits them onto the network.

After the monitor module runs the test for a predetermined period of time, it then brings the current AM down, reassigns the AM and restarts the test until each workstation on the network has been selected as the AM and has orchestrated network protocol during testing functions. In this way, each workstation has an opportunity to generate the system clock, and each workstation has an opportunity to react to the system clock generated by every other station on the network.

The preferred embodiment of the invention includes three software modules, a monitor module, a transmit module and a display module.

The monitor module begins operating on a network which is up and running with a preselected and active AM and at least one SM workstation. The monitor module begins a test session by collecting all the addresses and locations of each workstation on the network. The monitor module then notifies a chosen workstation that it is to become the next AM and sends it an alternate address that is higher than any other workstation on the network. The next AM then automatically withdraws from the network, reassigns itself the high address and reattaches to the ring. The monitor module then sends a signal to the current active monitor, forcing it to deassert itself as the AM. After the monitor contention process selects the next AM as the current AM, the monitor module transmits a signal to each transmit module on every other workstation to begin testing.

Once contacted, each transmit module begins to format phase jitter test data frames and waits for the token to transmit them onto the network. The latency limit of the network changes, second by second. With the addition and deletion of workstations the test data frame length must also change in order to bracket the worst case condition for phase jitter, that is, when the data frame transitions occur at the latency limit of the network.

In the preferred embodiment, the test date frame may alternate anywhere in a range between a programmably selected minimum and maximum length. The maximum and minimum frame lengths may be set by the user, and are generally set to include frame length that would correspond to 2.5 times the ring latency limit. Each test data frame is partitioned into five segments where each segment is made up of either 0's or 1's and alternates between segments. Each transmit module continues transmitting test data frames onto the network decrementing the test data frames by one byte in every segment each time.

The preferred embodiment employs segments which are the same length with five distinct segment, for example, 1111 0000 1111 0000 1111 or 10101. Other odd numbers of segments (other than one) may also be used. The result is a test data frame which is "scaled" while maintaining the five segment data pattern throughout scaling. The five segment 0–1 data pattern has two transitions from 0's to 1's and 1's to 0's.

FIG. 6 shows a sample data file showing the five segments and a comparison to ring latency. The preferred embodiment employs alternating patterns of all ones and all zeros because at the receiving station, phase jitter is introduced at the transition from ones to zeros (and vice versa). With five segments of alternating all zeros and all ones, there are two transitions from zeros to ones, and two transitions from ones to zeros. A worst case scenario is introduced if the transmitter is transitioning from zeros to ones (or vice versa) at the same time that it has just begun stripping bits off the ring on the receive side with a bad phase ramp caused by a similar transition (i.e. the first of the two, zeros to ones or ones to zeros transitions).

Jitter related error conditions are reported automatically by the NIC in each workstation and through error report MAC frames. A separate network analysis station, which is commercially available, is connected to the network and is connected to the network and is used to collect the data from the error report MAC frames and either instantaneously display the errors for observation or log them for future reference.

After the monitor module determines that the test is complete, it reassigns the AM and begins the process again. The process is repeated until each workstation in the network has an opportunity to become the AM, control the network clock and test for resulting jitter problems.

The display module is a user interface which shows system status and allows menu driven control of various options of the monitor and transmit programs.

DESCRIPTION OF THE DRAWINGS

FIG. 5 is an example of a configuration table.

FIGS. 7A–7C are flow charts of the steps executed in the monitor module of the preferred embodiment of the invention.

FIG. 9 is a display of the user interface of the display module.

DETAILED DESCRIPTION OF THE PREFERRED EMBODIMENT

The preferred embodiment of the invention consists of three software modules which are deployed on an active functioning token ring network. Their function and cooperation result in a catalog of clock phase jitter characteristics for the network.

The monitor module is a program designed to manage a test cycle including terminating the current AM, selecting which workstation is to become the next AM, collecting information on which workstation is presently the AM and collecting information on test completion status and test results.

Initially, the monitor module polls all workstations currently participating in the network and determines their addresses. These addresses are stored in a configuration table. The monitor module then assigns an artificial hierarchy of alternate addresses. An example of the configuration table generated is shown as FIG. 5. The table is used by the monitor module to coordinate the assignment of the next AMs, to keep track of test results and test completion status. When the monitor module determines that a new AM is required, it selectively forces the next AM workstation out of the network in order to allow it to change its primary address to the alternate address specified in the configuration table. The alternate address is chosen by the monitor module to be the high address on the network. The next AM then automatically reasserts itself bringing its token interface up with the new alternate (and highest) address on the ring. The monitor module then sends a signal to the current AM causing it to deassert itself as the AM. When each AM is deasserted, it sets its address back to its initial attributes including its primary address. The monitor contention process in the token ring protocol then automatically assigns the next AM priority status and testing begins again.

Several attributes and functions of the monitor module can be changed by the user. The monitor module uses a command line to set its various functions including the following flags d, t and h, with their usages being as follows:

The "d" flag allows the user to select which token ring adapter to perform the transmit function of the monitor module. Each workstation has the capability of supporting up to seven NICs specified by UNIX path names. The range of this flag is 0–7, indicating the use of paths /dev/tok0 through /dev/tok7. When the flag is omitted, the default value assigned by the path is 0, therefore using path /dev/tok0.

The "t" flag allows the user to select a time to pause between tests, that is, between the time one workstation has become the AM and the time the monitor module starts the process to select the next AM.

The "h" flag allows the user to select a command line help message.

Figure 7A:
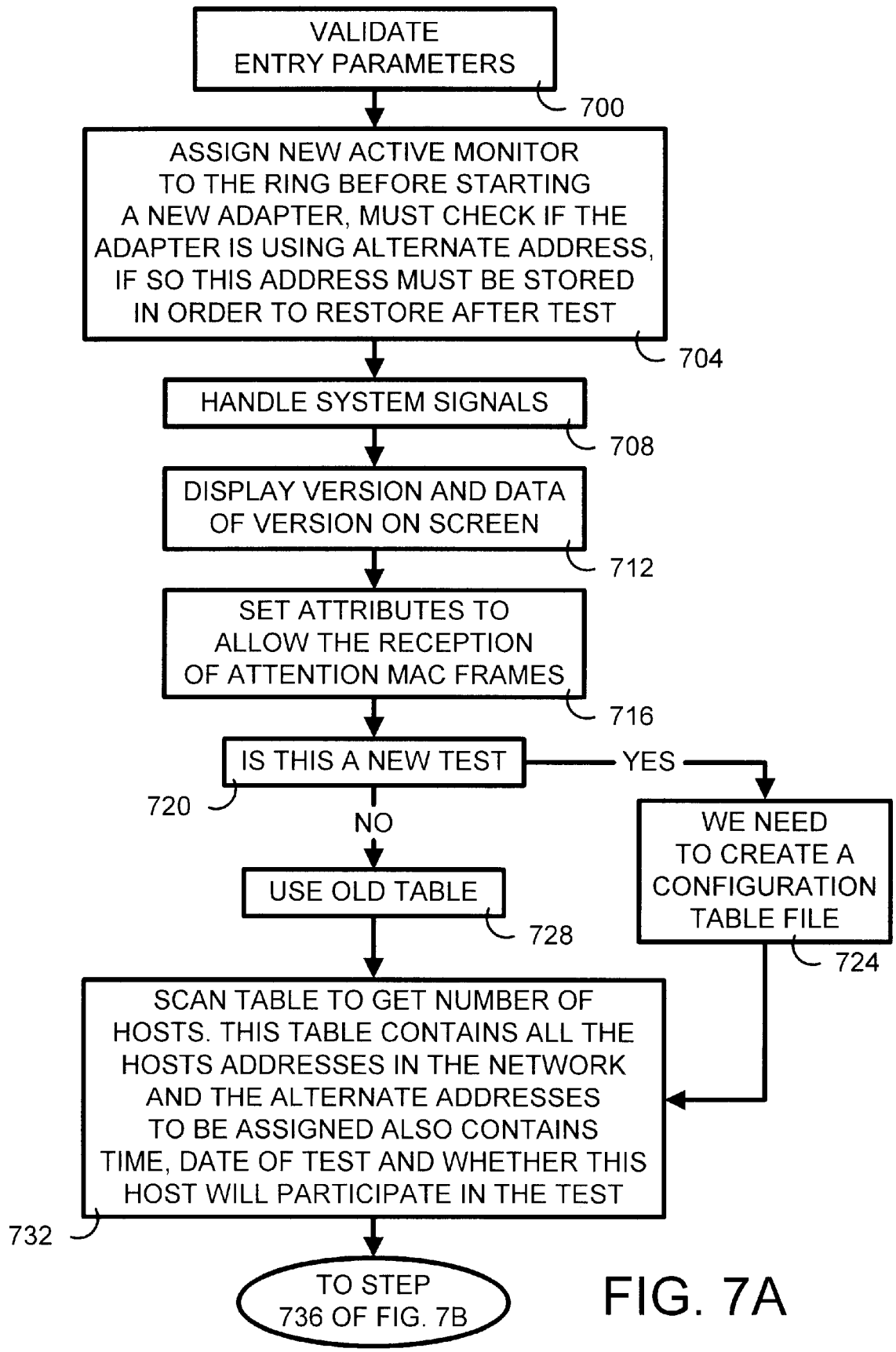
Figure 7C:
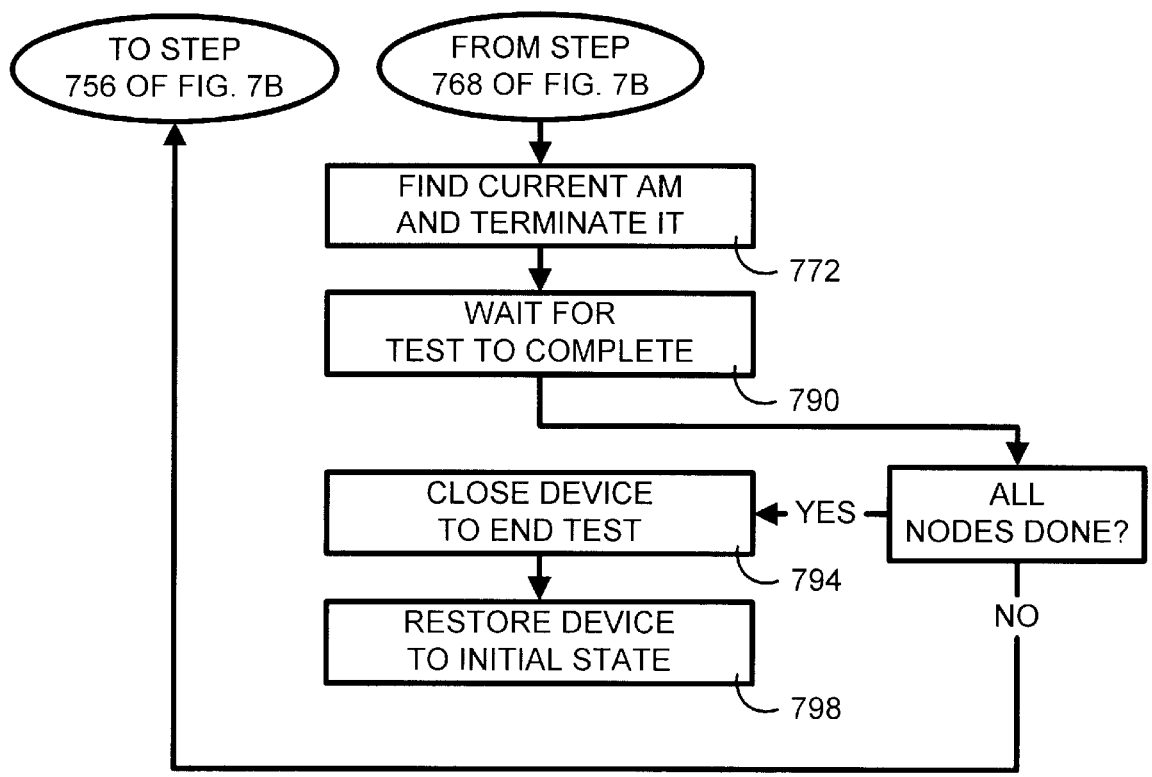

Referring to FIGS. 7A–7C, the specific steps used in the preferred embodiment of the monitor module will be described. At step 700, the monitor module validates the entry parameters of the token ring network. Essentially, it determines which workstations are located where on the network by collecting data as to primary address and ring location for each workstation. The monitor module also checks the status of the command line flags in step 700.

At step 704, the monitor module assigns a new AM to the ring before it activates a new adapter. In this step, the monitor module checks to see if the adapter is using the alternate address. If so, the address is stored in order to restore it after the test is complete. Additionally, at step 704, the monitor module creates the configuration table with primary and alternate addresses of each workstation and then arranges the addresses to create an artificial hierarchy on the network which is conducive to testing.

At step 708, the monitor module checks to assure that certain operating system control parameters have been successfully read and complied with. If a system override is detected, such as a control C keyboard entry, then the module exits normally. At step 712, the monitor module displays its status and other test data on the screen. At step 716, the monitor module sets its own attributes to allow reception of attention MAC frames. At step 720, the monitor module checks to see if this is a new test or a test continuation. If it is a new test, then at step 724, the workstation creates a new configuration table and skips to step 732. If not, then at step 728, the configuration table previously used for the prior test is used again. Moving to step 732, the configuration table is scanned to determine the number of workstations and their addressees on the network, their alternate addresses and an indicator flag as to which workstations will participate in the test. At step 736, the user has an opportunity to mark nodes in the table that should not be made active monitors.

At step 740, the monitor module checks for a specific error condition. The error condition arises when the workstation on which the monitor module was running was the AM at the time a prior test was taking place and was accidentally terminated during the test. To correct the error, the monitor module examines the configuration table to determine which workstation was assigned to be the last AM. If the current AM was the last on the list, the test is determined to have been completed successfully and the monitor module will continue with the next one. If not, an error condition exists and the current test is terminated. Also at step 740, the monitor module updates the structure of the ring, the configuration table and the Emergency Reset Table ("ERT") file before beginning an additional test. The ERT contains a copy of the data in the configuration file, as well as dates and times of execution of the monitor module.

At step 744, the monitor module checks to see if each workstation has been assigned as the AM. If so, the test is complete and the test sequence ends successfully at step 748. If not, at step 752, the monitor module opens the token ring adapter by sending a signal to the appropriate device driver but does not yet send any test frames onto the network. At step 756, a signal is sent to all of the transmit modules resident on each workstation with a start session transmit flag.

At step 760, the monitor module determines the next workstation on the token ring to become the next AM. It transmits a frame to that workstation notifying it of its pending status as AM and sends a configuration file specifying the next high address as the new address for that workstation. Step 768 is a wait state in which the monitor module waits for the next AM workstation to become active.

At step 772, the monitor module determines which workstation is the AM on the network and terminates it by sending a termination frame. Accordingly, the token ring network protocol elects the next AM which will be the desired station, recently opened with a high alternate address.

At step 790, the monitor module waits for the ongoing test to be completed, and proceeds to check to determine if all nodes have been tested at step 792. If so, the monitor module proceeds to step 794. If not, the monitor module returns to step 760 to select the next AM and continues testing.

At step 794, the monitor module, having completed its test, closes its adapter to end the test. At step 798, the workstation is then restored to its initial state.

The transmit module is responsible for generating a frame of varying length to be placed on the network as choreographed by the monitor module. The transmit module is deployed to all stations on the ring except for the AM.

Figure 1:
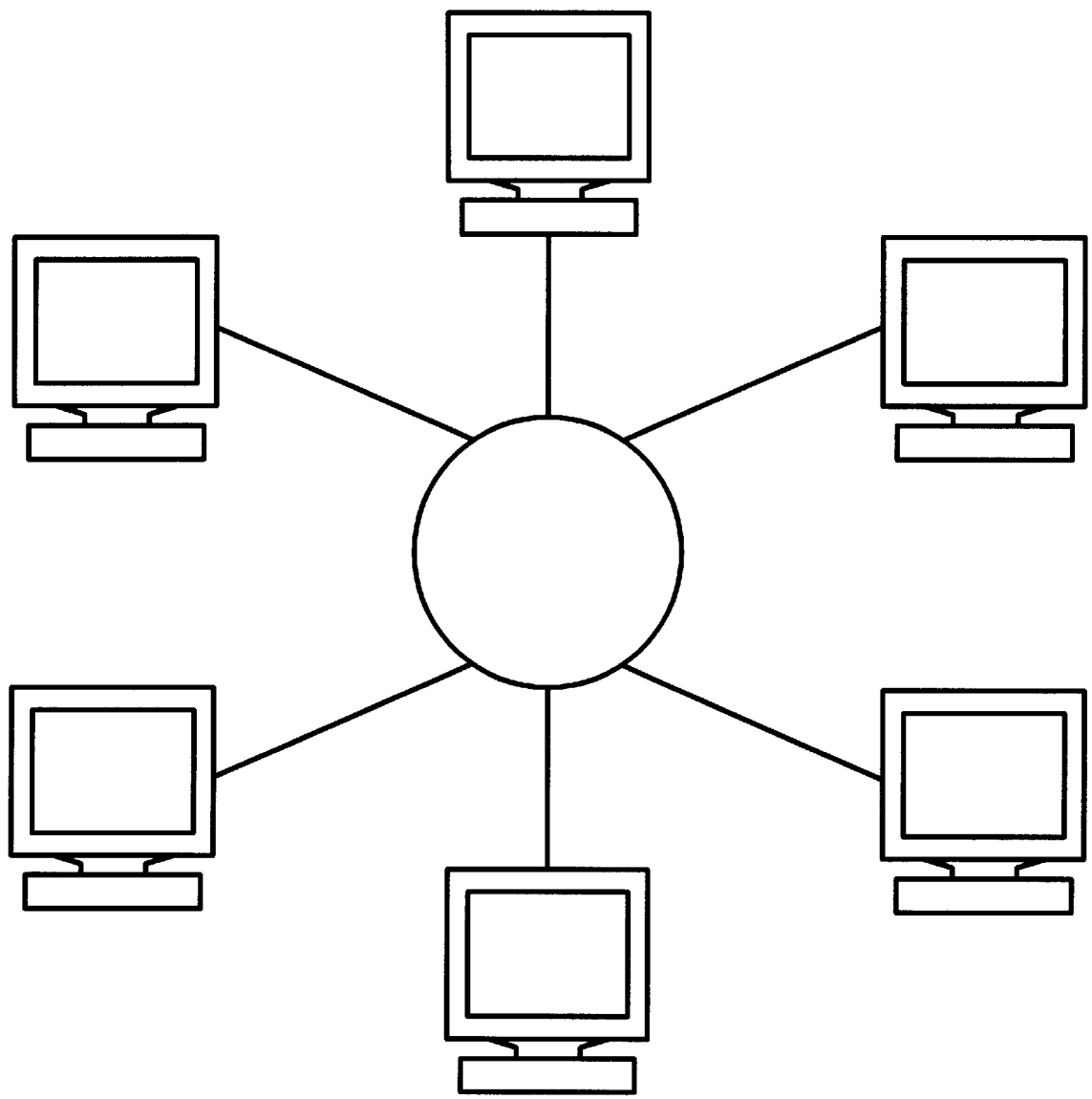
FIG. 1 illustrates a logical token ring network topology.
Figure 2:
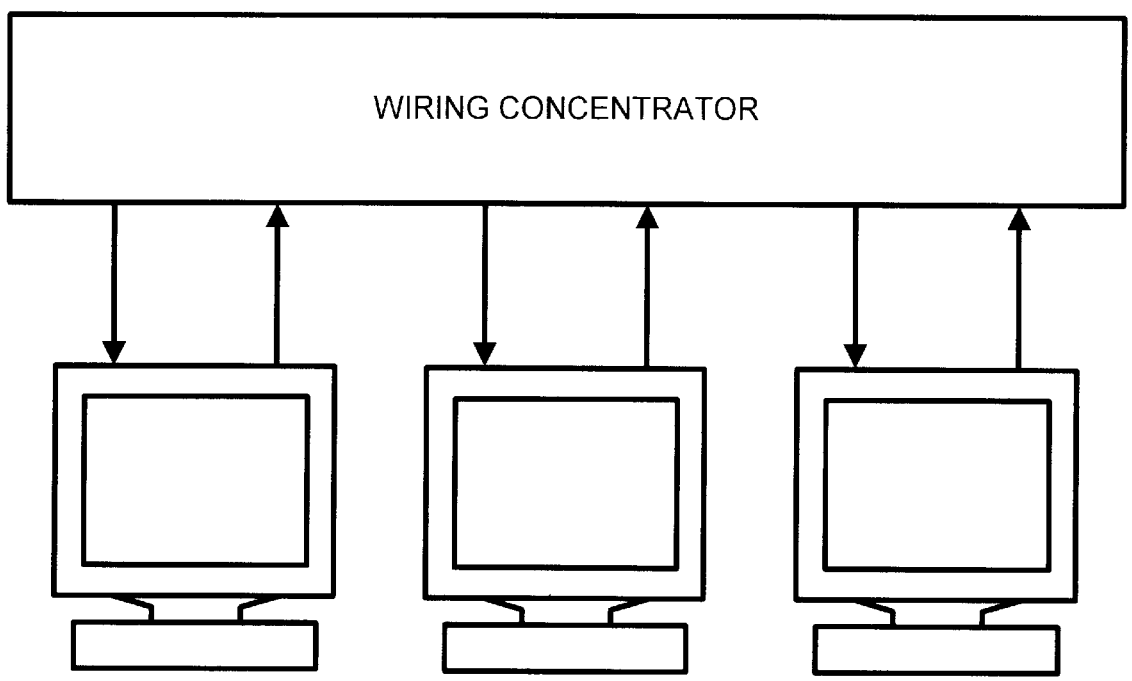
FIG. 2 illustrates a token ring network wiring concentrator using a logical ring topology in a star configuration.
Figure 3:
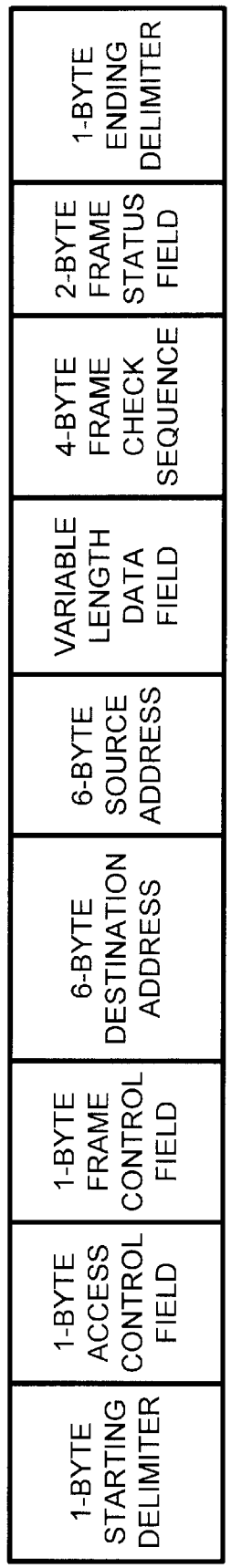
FIG. 3 illustrates a diagram of the ISO/IEC 8802-5 data frame structure.
Figure 6:
FIG. 6 is a diagram showing a sample of the test data file generated by the transmit module and an indication of corresponding ring latency.
Figure 4:
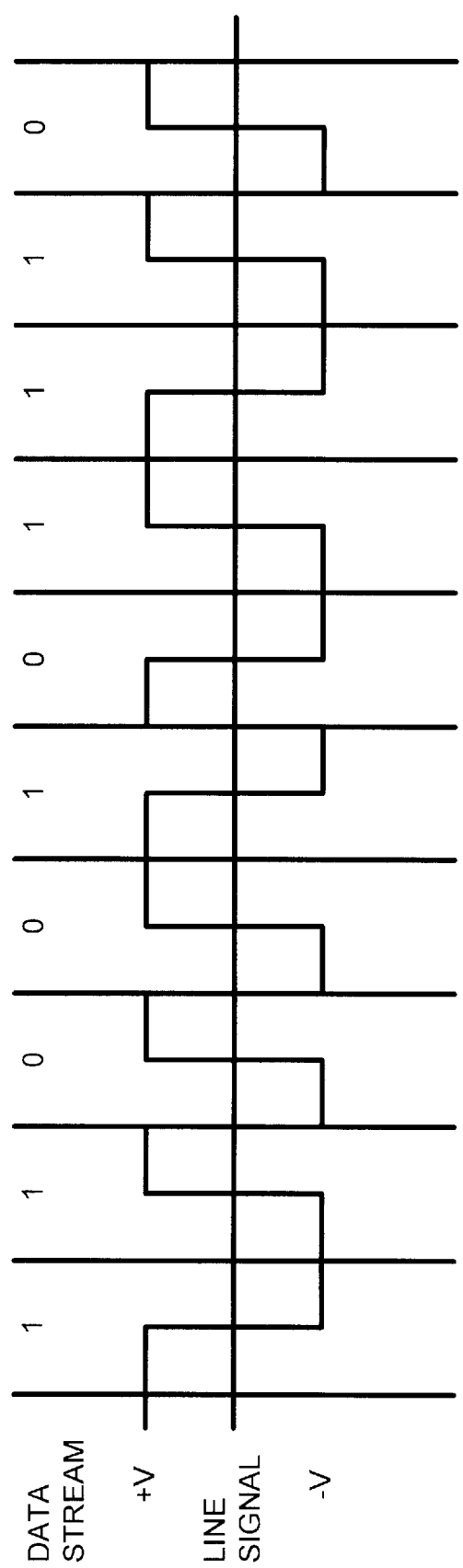
FIG. 4 illustrates Differential Manchester data coding.

The transmit module will transmit a frame which is subdivided into five equal size segments, containing predefined data patterns. The five segments contain a set of consecutive 0x0s for even segments and 0xffs for odd segments. An example is shown in FIG. 6. The data frame is segmented to correspond to the ring latency of the network. The calculations necessary to determine the frame length to correspond with the ring latency is shown below:

$$fl = \frac{rl \cdot rs}{8}$$

where, rs=Ring Speed, fl=frame length and rl=ring latency.

The size of the test data frame is optimally set to 2.5 times the latency limit or the maximum data frame length that can transverse the ring during one latency period (i.e. 2.5×fl). If a transmitting station is receiving and stripping the first zeros to ones segment transition (or vice versa), at the same time as it is transmitting the second zeros to ones segment transition (or vice versa)—then a worst case jitter producing scenario is created because the transmitter is extracting a clock with a bad phase ramp caused by the first transition at the same time as it is transmitting the second transition. In other words, the clock that is being extracted on the receive side, and used to transmit data on the transmit side, has a bad phase ramp; and simultaneously, it is transmitting the second transition which causes additional phase jitter in downstream nodes. If the PLL circuit of any station on the ring cannot track the phase shift caused by the cumulative effect of the phase error in the test frame, a line error occurs. This occurrence is included in the next error report MAC frame transmitted by that adapter.

The transmit module begins operation with the range of data frame lengths desired. This range should include the length represented by 2.5 fl. It automatically decrements the test data frame by 5 bytes, one byte per segment, each time a test data frame is transmitted. The result is that the data frame and its segments are "scaled" down or "tuned" while maintaining the alternating 0 and 1 segment structure which encourages phase jitter. Each station with the special transmit module transmits continuously using a null destination address.

When instructed by the monitor module, the transmit module will bring the adapter interface down, will close the adapter and bring the adapter interface up using the alternate address which has been previously assigned by the monitor module.

The frame size and other basic operation of the transmit module can be specified on the command line by using flags. The following flags are allowed d, f, 1l, t, a and h.

The "d" flag allows the user to perform the transmit function. The range is 0–7 indicating the use of paths /dev/tok/0 to /dev/tok/7. When this flag is emitted, the default value assigned by the program is 0 therefore using the path /dev/tok0.

The "f" flag allows the user to select the maximum length of the frame to be transmitted. Since the program will transmit a number of frames starting with the specified length and decrease it by 5 bytes per iteration, the test length is directly affected by the frame specified. In case the frame entered by the user is not devisable by five, transmit module normalizes the frame size to the nearest smallest frame which is devisable by five. If the flag is not specified, once the program reaches the smallest frame sent, i.e. 5 bytes, it will repeat sending the initially specified maximum frame size until the user can interrupts its execution. The values allowed for the files transmitted are 5 to 16,000. If 5 is specified only one frame will be sent. The default frame size for the program is 500 bytes.

The "1" flag allows the user to select the number of cycles the test should continue execution. A complete cycle consists of the transmit module transmitting files beginning with the maximum number of bytes and decreasing it to the minimum number specified. When the 1 flag is not specified, the program will cycle forever. That is, after decreasing the file size to a minimum number of bytes, it will automatically jump back to the maximum number of bytes and begin transmitting test frames again. This condition can only be achieved by omitting the flag. The range for this flag is 1–999999 cycles.

The "t" flag allows the user to select a time delay in milliseconds between every frame is transmitted. A low number for this time delay will increase the network traffic since more frames will be sent during a smaller period of time.

The "a" flag allows the user to selectively run the transmit module using the alternate address, as will described later. This forces the transmit module to bring up the adapter interface using the alternate interface as assigned by the monitor module.

The "h" flag allows the user to select a command line help message. The help messages are preprogrammed and stored in a file resident on the workstation which is installed at the same time the transmit module is deployed on the network.

The "L" flag allows the user to select the length of the smallest frame to be transmitted. If the value of the "L" flag is set to be equaled to the value of the "f" flag, the actual frame size will not vary during the test.

If no flags are specified, the transmit module defaults to the following flag settings: d=0, f=500 and t=1.

Figure 8A:
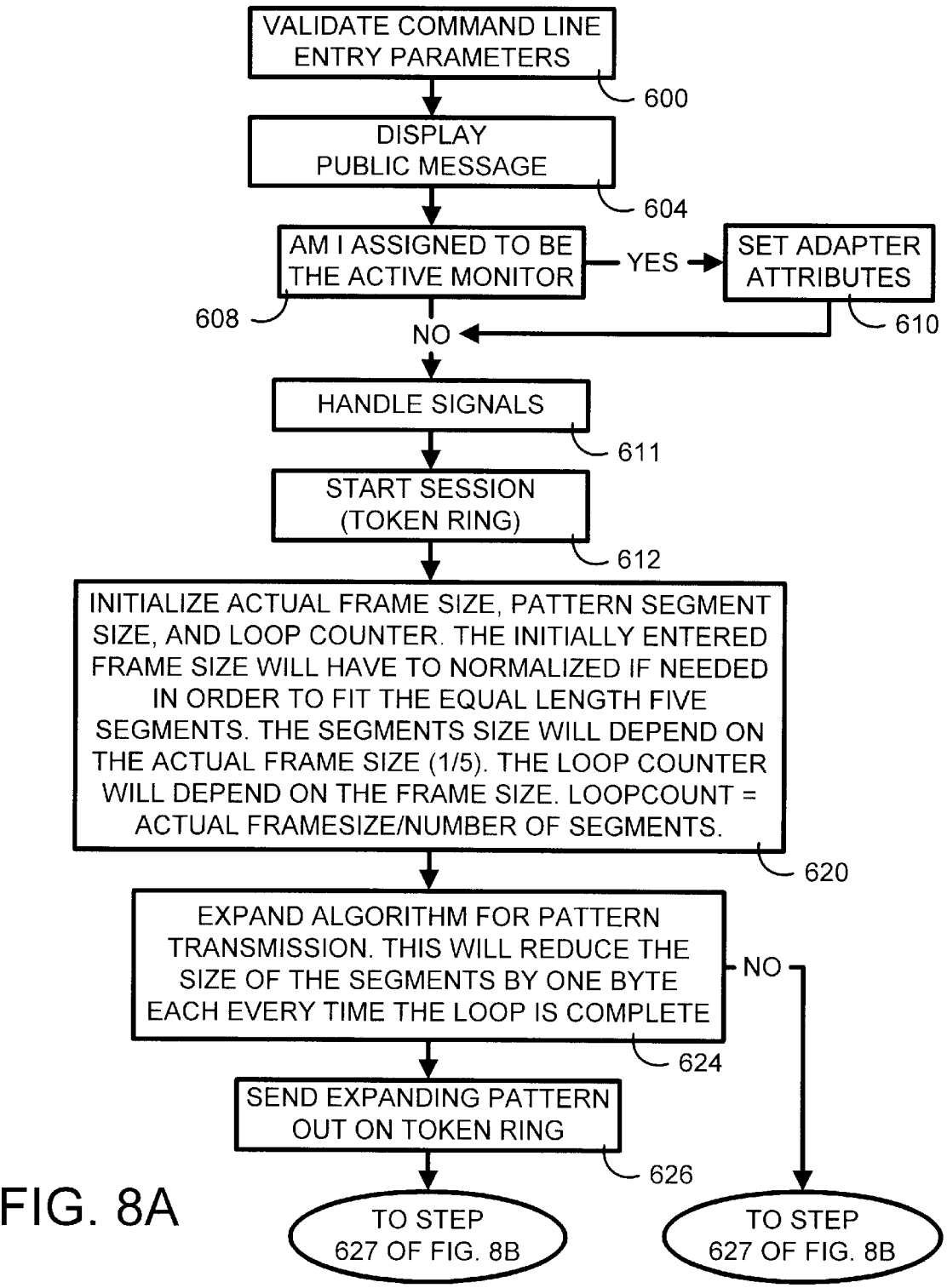
FIGS. 8A–8C are flow charts of the steps executed in the transmit module of the preferred embodiment of the invention.
Figure 8B:
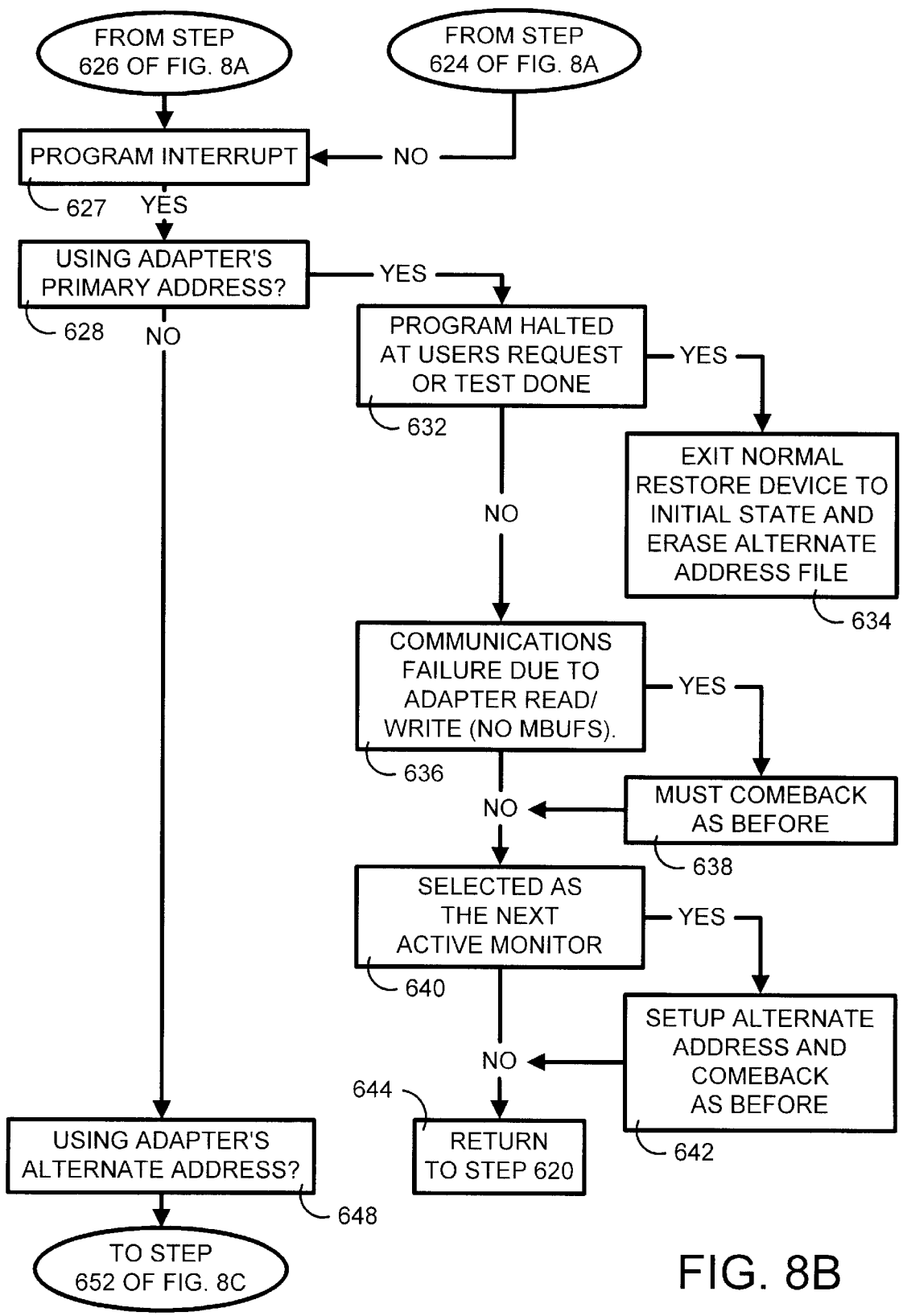
Figure 8C:
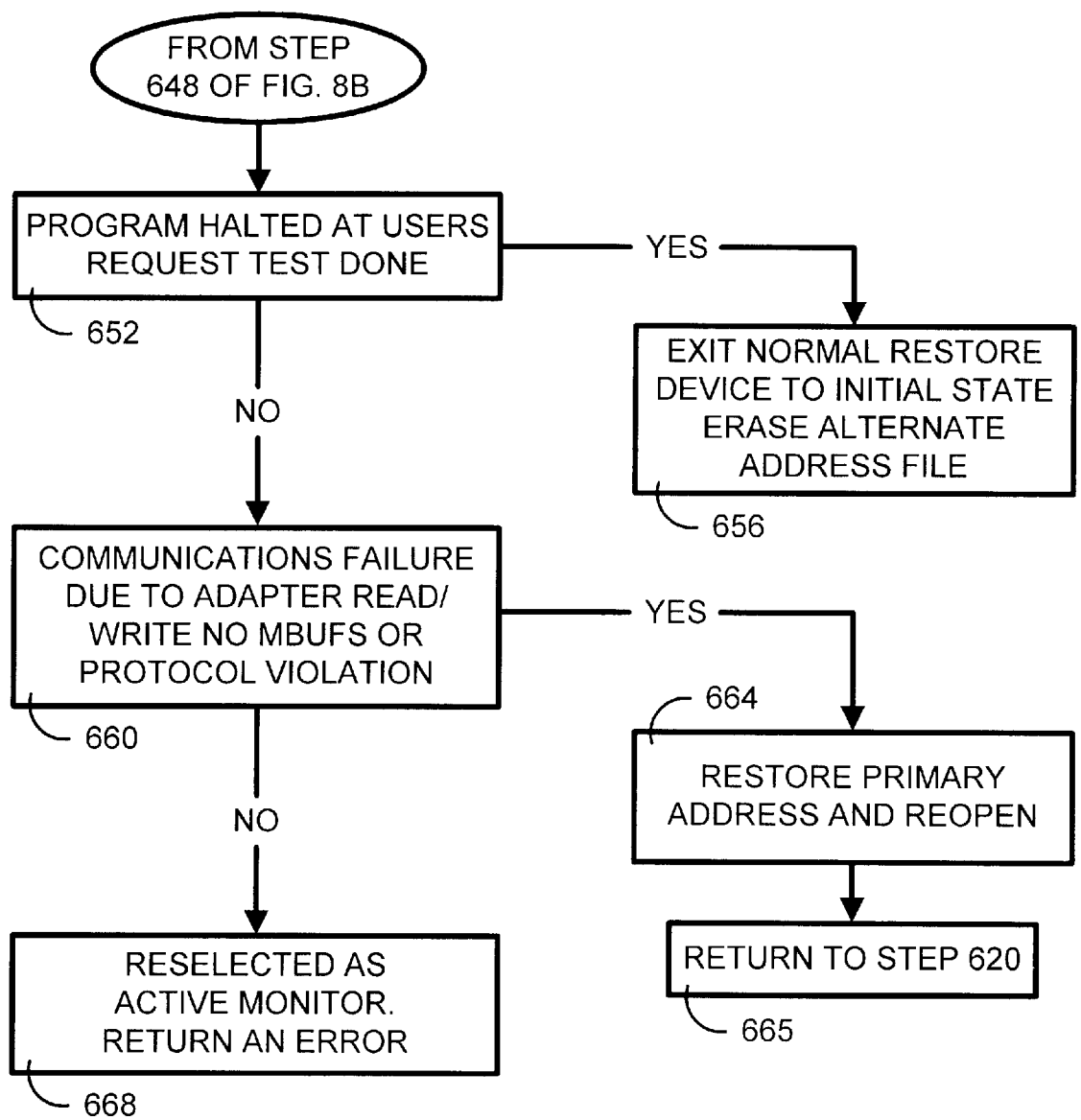

FIGS. 8A–8C shows a flow chart of the transmit module. The transmit module begins operation at step 600 by reading and validating the command line entry parameters. The command line entry parameters comprise the command flags and the numeric value of the latency limit of the network. Step 604 displays a public message on the screen indicating the flags chosen and that a test is underway.

At step 608, the transmit module checks to see if it has been assigned the AM. If so, it sets the adapter attributes at step 610. If at step 608, the workstation is not to be assigned to be the AM, it uses its default address.

At step 611, the monitor program checks to assure that certain operating system control parameters have been successfully read and complied with. If a system override is detected, such as a control C keyboard entry, the module exits normally.

At step 612, the NIC is activated to begin an insert onto the ring.

At step 620, the transmit module begins the token ring test procedure. It does this by initializing the actual frame size, the pattern segment size and the loop counter. At step 624, the module generates the pattern frame and waits to receive the token. When it receives the token, it transmits the frame at step 626. The transmit module stays in a loop, transmitting test frames within the minimum and maximum frame length, until a program interrupt is encountered at step 627.

When a program interrupt occurs, a check is made at step 628 by the transmit module to determine whether the primary address has been used to transmit the files. If the primary address has been used, then the transmit module checks several conditions.

At step 632, the module checks to see if the program is halted at the user's request or if the test has been completed. If so, at step 634, the module exits normally, restores the workstation to initial state as it existed before the test began, and erases the alternate address file created by the monitor module. If the module is not halted at the user's request or the test completed normally, then the module at 636 checks for a communication failure such as an adapter read/write error. At step 638, the module returns the appropriate error code. If there has not been a communications failure at step 636, then at step 640 the module checks to see if the workstation on which it is resident is selected to become the next AM. If it has, then at step 642 it sets up an alternate address and returns to step 620. If it has not, then at step 644, the module returns to step 620 without changing the adapter's primary address.

If at step 628, the workstation is not transmitting according to the adapter's primary address, then a check is made to assure that the workstation is transmitting using the adapter's alternate address at step 648.

By step 652, the module determines if the user wants to halt the program. If it has, at step 656, the module exits normally, restores the workstation to its initial state and erases the alternate address file. If the module is not halted at the user's request, then at step 660, the module checks to determine if there has been a communication error due to an adapter read/write, AM assignment, or overflow or protocol violation. If any of these conditions exist, then at step 664, the module restores the adapter's primary address and returns to step 620 at step 665. If not, then at step 668, the module assumes that there has been an error because an unexpected condition exists. That is, that the workstation is selected to become the next AM but already has been assigned to be the AM. Here an error is returned and the module is exited.

The display module forms the user interface for the monitor module and its coordinating functions. As shown in FIG. 9, the display module sets up a menu including six menus of choices. The halt test menu, the suspend test menu, the resume test menu, the table menu, the reset address menu and the AM menu.

The halt test menu controls the functions of the monitor module which stops specific workstations or designates workstations which will not be able to return to the test. The suspend test menu allows for specific workstations to be withdrawn from testing or selects which workstation which will not participate in the test but can resume testing on command. The resume test menu allows suspended workstations to return to testing.

The table menu allows a display of test configuration table. The set/reset address menu allows the user to change or alternate the primary address of any workstation. The AM menu allows the user to select which user will become the next AM.

The preferred embodiment of the invention requires a local area network analyzer to intercept and catalog the error frames generated which are associated with phase jitter. Several hardware and software products are commercially available. One example is the Tinwald LinkView 2000 network analyzer. Additionally, in an alternate embodiment, the monitor module can intercept, decode and store the MAC error frames responsible for reporting network jitter related events. In any of the above cases, the data may either be stored for later analysis or displayed for real time analysis.

In summary, once the transmit module has been disseminated to each workstation on the network and the monitor module has reassigned the first AM and testing begins. The monitor module sends a test signal to each workstation which in turn activates the transmit module which is resident there. Each transmit module begins to generate a test frame consisting of five alternating segments of equal length. Each transmit module then scales the test frame between a maximum and minimum length and transmits it on the network. Due to 0–1 and 1–0 data transitions set up by the test file structure, data frames encouraging clock phase jitter are generated by the NIC hardware and are transmitted onto the network. A test "sniffer" or other hardware/software designed to recognize and record the Error Report MAC frames indicating jitter then receives the error frames and logs them accordingly. After a predetermined length of time, the monitor module selects a next AM and notifies it. The next AM removes itself from the ring, changes its address to the alternate high address provided by the monitor module, and then re-opens onto the ring. The monitor module then deactivates the current AM with a special terminate frame. Monitor contention results and the new AM is selected. Testing then resumes as each workstation begins again to transmit scaled test frames to encouraging phase jitter. After each workstation has alternatively been assigned the role of AM, the test is concluded. Phase jitter data can then be analyzed to determine which, if any, adapters have jitter intolerance.

Having described specific embodiments of the present invention, it will be understood that modifications thereof may be suggested to those skilled in the art, and it is intended to cover all such modifications as fall within the scope of the appended claims.

What is claimed is:

1. A method for testing a token ring network for clock phase jitter errors comprising the steps of:
   a. determining a latency limit of the network;
   b. tuning a data frame to provide for data transitions that match a ring latency;
   c. transmitting the tuned frame on the network; and
   d. observing clock phase jitter errors of at least one network station;
   e. changing an active monitor on the network;
   f retransmitting the tuned frame on the token ring;
   g. observing the clock phase jitter of the at least one network station.

2. An apparatus for testing a token ring network for clock phase jitter sensitivity comprising:
   a. a means for tuning a data frame to provide for data transitions that match a ring latency;
   b. a means for transmitting the tuned frame on the network; and
   c. a means for observing the clock phase jitter errors at least one network station as a result of transmission of the tuned frame;
   d. a means for changing an active monitor on the network; and
   e. a means for retransmitting the tuned frame on the network.

3. The method of claim 1 wherein the step of tuning further comprises
   a. changing the length of the tuned frame while maintaining data transitions matching the ring latency of the network; and
   b. retransmitting the tuned frame.

4. The method of claim 1 wherein the tuned frame consists of five equal length segments.

5. The method of claim 4 wherein the segments alternate between all 0's and all 1's.

6. The method of claim 1 wherein the tuned frame is about 2.5 times the length required by the ring latency.

7. The method of claim 1 wherein the step of observing includes logging the observed clock phase jitter errors in a file.

8. The method of claim 1 wherein the step of observing includes displaying the clock phase jitter errors.

9. The method of claim 1 wherein the step of changing includes reassigning addresses to each station on the network in sequential order.

10. The method of claim 1 wherein a length of the tuned frame is calculated by the following formula:

$$fl = \frac{rl \cdot rs}{8}$$

where, rs=Ring Speed, fl=frame length and rl=ring latency.

11. A method for testing a token ring network for clock phase jitter sensitivity comprising the steps of:
   a. establishing an active monitor on the network;
   b. generating a test frame at each station on the network;
   c. transmitting the test frame from each station onto the network;
   d. observing a clock phase jitter tolerance at each station on the network;
   e. establishing a next active monitor and repeating steps a–d; and
   f. repeating step e until a preselected number of stations have been established as the active monitor.

12. The method of claim 11 wherein the step of generating further comprises:
   a. determining the latency of the ring;
   b. setting a maximum test frame data length larger than that which can be transmitted within a latency period; and
   c. setting a minimum test frame data length smaller than that which can be transmitted within the latency period.

13. The method of claim 12 wherein the maximum test frame data length is about 2.5 times that which can be transmitted within the latency period.

14. The method of claim 11 wherein the test frame is divided into an odd number of equal segments.

15. The method of claim 14 wherein the odd number is 5.

16. The method of claim 11 wherein the test frame is comprised of alternating segments containing 1's and 0's.

17. The method of claim 16 further comprising the steps of:
   a. decrementing each test frame by 5 bytes; and
   b. retransmitting each test frame.

18. The method of claim 17 wherein the step of decrementing comprises decrementing each segment by one byte.

19. The method of claim 11 wherein the step of observing further comprises logging errors generated at each station on the network.

20. A method for testing a token ring network for clock phase jitter sensitivity comprising the steps of:
   a. providing a master processor and at least one station processor connected to the network;
   b. programming the master processor with a monitor module and each station processor with a sender module;
   c. coding the monitor module to carry out the following steps:
      i. poll all stations on the network to determine each station's address;
      ii. assign a high address to one station processor;
      iii. transmit a test signal to each station processor;
      iv. transmit a next active monitor signal to at least one station processor;
      v. reexecute steps (ii), (iii) and (iv) until a predetermined set of station processors have become an active monitor.
   d. coding the sender module to carry out the following steps:
      i. generate a test frame;
      ii. transmit the test frame onto the network upon receipt of the test signal from the master processor;
      iii. alter the length of the test frame.
   e. observing network jitter errors generated by the master processor and each station processor on the network.

21. The method of claim 20 wherein the step of observing further comprises providing an observer processor programmed to record the network jitter errors.

22. The method of claim 20 wherein the step of observing further comprises tabulating and displaying network hardware jitter errors.

23. The method of claim 20 wherein the step of generating further comprises:
   a. setting an upper bound and a lower bound on the length of the test frame;
   b. the upper bound being greater than the length needed to overlap the ring latency limit of the network; and
   d. the lower bound being smaller than the length needed to overlap the ring latency limit of the network.

24. The method of claim 20 wherein the upper bound is about 2.5 times the length needed to equal the ring latency.

25. The method of claim 20 wherein the test frame is comprised of an odd number of equal segments.

26. The method of claim 25 wherein the odd number is 5.

27. The method of claim 20 wherein the segments are comprised of all 0's or all 1's and are arranged in alternating order.

28. An apparatus for testing a token ring network for clock phase jitter sensitivity comprising:
   a. a master processor and at least one station processor connected to the network;
   b. the master processor programmed with a monitor module and each station processor programmed with a sender module;
   c. the monitor module coded to carry out the following steps:
      i. poll all stations on the network to determine each station's address;
      ii. assign a high address to one station processor;
      iii. transmit a test signal to each station processor;
      iv. transmit a next active monitor signal to at least one station processor;
      v. reexecute steps (ii), (iii) and (iv) until a predetermined set of station processors have been assigned the high address.
   d. the sender module coded to carry out the following steps:
      i. generate a test frame;
      ii. transmit the test frame onto the network upon receipt of the test signal from the master processor;
      iii. alter the length of the test frame.
   e. an observation processor connected to the network to observe network hardware jitter errors generated by each station processor on the network.

29. The apparatus of claim 28 wherein the observation processor is programmed to record network hardware jitter errors.

30. The apparatus of claim 28 wherein the observation processor is programmed to tabulate and display network hardware jitter errors.

31. The apparatus of claim 28 wherein the sender module is further coded to:
   a. set an upper bound and a lower bound on the length of the test frame;
   b. the upper bound being greater than the latency limit of the network; and
   c. the lower bound smaller than the latency limit.

32. The apparatus of claim 31 wherein the upper bound is about 2.5 times the latency limit of the network.

33. The apparatus of claim 28 wherein the test frame is comprised of five equal segments.

34. The method of claim 28 wherein the segments are comprised of all 0's or all 1' and are arranged in alternating order.

35. An apparatus for testing a token ring network for clock phase jitter related errors comprising:
   a. a means for establishing an active monitor on the token ring network;
   b. a means for generating a test frame at each station on the network;
   c. a means for transmitting the test frame from each station onto the network;
   d. a means for observing the clock phase jitter errors produced at preselected stations on the network;
   e. a means for establishing a next active monitor and repeating steps a–d; and
   f. a means for repeating step e until a preselected number of stations have been established as the active monitor.

36. The apparatus of claim 35 wherein the means for generating further comprises:
   a. a means for setting the test frame length to a maximum and a minimum value;
   b. the maximum value of the test frame length being larger than that which can be transmitted within a latency period of the network and;
   c. the minimum value of the test frame length being shorter than that which can be transmitted within the latency period of the network.

37. The apparatus of claim 36 wherein the maximum test frame length is about 2.5 times that which can be transmitted within the latency period.

38. The apparatus of claim 35 wherein the test frame is divided into equal segments.

39. The apparatus of claim 35 wherein the test frame is comprised of alternating segments containing 1's and 0's.

40. The apparatus of claim 35 further comprising a means for decrementing the test frame each time it is transmitted.

41. The apparatus of claim 38 wherein the means for decrementing includes decrementing each segment by one byte.

42. The apparatus of claim 35 wherein the means for observing further comprises a means for logging errors generated by each station.

43. The apparatus of claim 2 wherein the step of tuning further comprises:
   a. a means for changing the length of the tuned frame while maintaining data transitions matching the ring latency of the network; and
   b. a means for retransmitting the tuned frame.

44. The apparatus of claim 2 wherein the tuned frame consists of equal length segments.

45. The apparatus of claim 44 wherein the segments alternate between all 0's and all 1's.

46. The apparatus of claim 2 wherein the tuned frame is about 2.5 times the maximum length allowed by the ring latency.

47. The apparatus of claim 2 wherein the step of observing includes a means for logging the observed clock phase jitter errors.

48. The apparatus of claim 2 wherein the step of observing includes a means for displaying the clock phase jitter errors.

49. The apparatus of claim 2 wherein the step of changing includes a means for reassigning addresses to each station on the network in sequential order.

50. The apparatus of claim 2 wherein a length of the tuned frame is calculated by the following formula:

$$fl = \frac{rl \cdot rs}{8}$$

where, rs=Ring Speed, fl=frame length and rl=ring latency.

* * * * *